United States Patent [19]

Arai

[11] 4,447,137
[45] May 8, 1984

[54] LARGE-APERTURE TELEPHOTO LENS

[75] Inventor: Yasunori Arai, Tokyo, Japan

[73] Assignee: Asahi Kogaku Kogyo Kabushiki Kaisha, Tokyo, Japan

[21] Appl. No.: 420,683

[22] Filed: Sep. 21, 1982

[30] Foreign Application Priority Data

Jan. 23, 1982 [JP] Japan .................................. 57-9214

[51] Int. Cl.³ .......................... G02B 13/02; G02B 9/62
[52] U.S. Cl. ................................................. 350/454
[58] Field of Search ......................................... 350/454

[56] References Cited

U.S. PATENT DOCUMENTS 3,997,248 12/1976 Fujii .................................... 350/454
4,240,699 12/1980 Sato et al. ....................... 350/454 X Primary Examiner—John K. Corbin
Assistant Examiner—Scott J. Sugarman
Attorney, Agent, or Firm—Sughrue, Mion, Zinn, MacPeak & Seas

[57] ABSTRACT

A large-aperture telephoto lens comprising seven lens elements in six lens components, the first lens component having a positive lens, the second lens component having a doublet composed of a negative-meniscus lens with its concave side facing an image and a positive-meniscus lens, the third lens component having a negative-meniscus lens with its concave side facing the image, the fourth lens having a meniscus lens with its concave side facing an object, the fifth lens component having a positive-meniscus lens with a surface of a larger curvature facing the object, and the sixth lens component having a positive lens.

4 Claims, 8 Drawing Figures

LARGE-APERTURE TELEPHOTO LENS

BACKGROUND OF THE INVENTION

The present invention relates to a large-aperture telephotographic lens of high performance having $F_{NO}$ of 1:1.8-2, and an angle of view on the order of 18°.

One generally used telephoto lens having an angle of view on the order of 18° is known as an Ernostar-type telephoto lens. This type of telephoto lens has improved aberrations normally at $F_{NO}$ of 1:2.8. However, with telephoto lenses having larger apertures such as $F_{NO}$ of 1:1.8-2, the spherical aberration is increased and is overly compensated for with respect to light having short wavelengths (for example, in the vicinity of g-line 436 nm). There are known large-diameter telephoto lenses which have coped with such problems by thickening front-group lenses or using a doublet in the front lens group. However, the prior telephoto lenses have proven unsatisfactory in performance. Furthermore, since large-aperture lenses are subjected to increased variations in various aberrations dependent on the positions of objects, it has been quite difficult to keep required high performance over a wide range from the infinite distance to close positions.

SUMMARY OF THE INVENTION

It is an object of the present invention to provide a large-diameter, relatively compact telephoto lens of high performance which will eliminate the foregoing difficulties.

DESCRIPTION OF THE PREFERRED EMBODIMENTS

Figure 1:
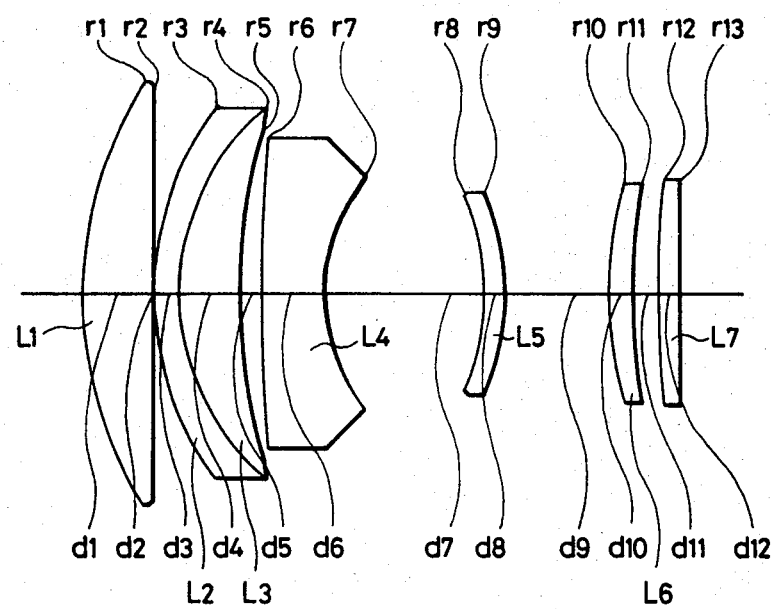
FIG. 1 is a cross-sectional view of a lens according to Example 1.

The present invention will be described in detail with reference to its preferred embodiments. In the following description and in the appended claims, a "lens component" may include either a single lens or a plurality of lenses grouped together.

According to the present invention, there is provided a large-aperture telephoto lens comprising seven lens elements in six lens components, the first lens component having a positive lens $L_1$, the second lens component having a doublet composed of a negative-meniscus lens $L_2$ with its surface concave side facing an image and a positive-meniscus lens $L_3$, the third lens component having a negative-meniscus lens $L_4$ with its surface concave side facing the image, the fourth lens component having a meniscus lens $L_5$ with its concave side facing an object, the fifth lens component having a positive-meniscus lens $L_6$ with a surface of a larger curvature facing the object, and the sixth lens component having a positive lens $L_7$. The large-aperture telephoto lens is constructed to meet the following requirements:

$$1.60 < \frac{n_1 + n_2}{2}, \ 50 < \frac{\nu_1 + \nu_3}{2}; \tag{1}$$

$$|n_2 - n_3| < 0.1, \ \nu_3 - \nu_2 > 10, \ 0.2f < r_4 < 0.35f; \tag{2}$$

$$0.35f < f_{1,2,3} < 0.55f; \tag{3}$$

$$|f_5| > 4f, \ 0.2f < -r_8 < 0.4f; \tag{4}$$

$$0.35f < r_{10} < f; \text{ and} \tag{5}$$

$$0.25 < f/f_7 < 0.45 \tag{6}$$

where
 $n_i$: the refractive index of the ith lens along d-line;
 $\nu_i$: the Abbe number of the ith lens;
 f : the focal length of the overall lens system;
 $r_i$: the radius of curvature of the ith surface;
 $f_{1,2,3}$: the composite focal length of the first through third lenses; and
 $f_i$: the focal length of the ith lens.

The above requirements will now be described.

The requirement (1) relates to a material of the positive lenses in the front lens components (the first through third lens components), and is concerned with achromatic and Petzval's conditions. If $(n_1+n_3)/2$ in the requirement (1) were smaller than 1.60, then the Petzval's sum would be increased, the curvature of an image plane would become excessive, the radius of curvature of each of the surfaces of the positive lenses would be increased, and various aberrations such as spherical aberration would become larger. If $(\nu_1+\nu_3)/2$ were smaller than 50, then chromatic aberration caused by the positive lenses would be excessive and could not be compensated for properly.

The requirement (2) is directed to the doublet of the second lens component. According to the present invention, the doublet employed as the second lens component compensates to a high degree for spherical aberration with respect to wavelengths in the vicinity of the g-line. By determining the refractive index, the Abbe number, and the radius of curvature $r_4$ of a material of the doublet according to the requirement (2), a hyperchromatic surface can be provided in the doublet for independent control of chromatic aberrations caused by the first and second lens components. If the value $|n_2-n_3|$ in the requirement (2) were greater than 0.1, then the hyperchromatic effect would be reduced resulting in difficulty to correct the chromatic aberrations independently. If $\nu_3-\nu_2$ were smaller than 10, then chromatic correction at the hyperchromatic surface, especially spherical aberration correction with respect to light having short wavelengths could not be effective. If $r_4$ were below the lower limit, chromatic aberration would become excessive, and there would be difficulty in fabricating the lens. If $r_4$ exceeded the upper limit, then chromatic aberration could not be corrected sufficiently, and spherical aberration with respect to short-wavelength light would be corrected quite excessively.

The requirement (3) is concerned with the combined focal length of the first and second lens components, and is required to render the lens smaller in size. If the combined focal length $f_{1,2,3}$ were smaller than the lower limit of the range of the requirement (3), the lens could be smaller in size, but the entrance height of incident light falling on the third lens component would be reduced and the third lens component would have excessive negative power, so that spherical aberration and coma of higher order would be caused, distortion would become excessive, and correction for the fourth lens component and the succeeding lens components would be rendered difficult to carry out. If $f_{1,2,3}$ were larger than the upper limit, then the power of each lens would be reduced making it effective to correct aberrations, but the lens would be larger in size.

The requirement (4) is directed to the fourth lens component. The fourth lens has no large power, but serves to correct spherical aberration and coma of higher order which have been generated and left by the lens components up to the third lens component as the fourth lens component has a surface having a large radius of curvature which is concentric with respect to aperture. More specifically, by maintaining $|f_5|$ above $4f$, the eighth surface $r_8$ is given a large radius of curvature as defined by the requirement (4) to cause aberration of higher order at the eighth and ninth surfaces without affecting aberration of lower order, thus cancelling out remaining aberration generated up to the third lens component. If $-r$ were smaller than the lower limit of the requirement (4), then aberration of higher order would overly be generated, and coma would particularly be caused with respect to rays of light travelling outside the optical axis. If $-r_8$ were greater than the upper limit, then the remaining aberration of higher order up to the third lens component could not be compensated for, and hence the object of the fourth lens component could not be achieved.

The requirement (5) is needed for correcting distortion. With the lens system according to the present invention, spherical aberration, coma and the like which have produced by the front lens components or the first through third lens components are substantially corrected up to the fourth lens component. However, distortion still remains uncorrected. By determining the radius of curvature $r_{10}$ of the surface of the fifth lens component which faces the object as defined by the requirement (5), the lens system has a sufficiently low distortion. If $r_{10}$ were larger than the upper limit of the requirement (5), then no distortion could be corrected, and if $r_{10}$ were smaller than the lower limit, then distortion would be corrected overly.

Figure 2:
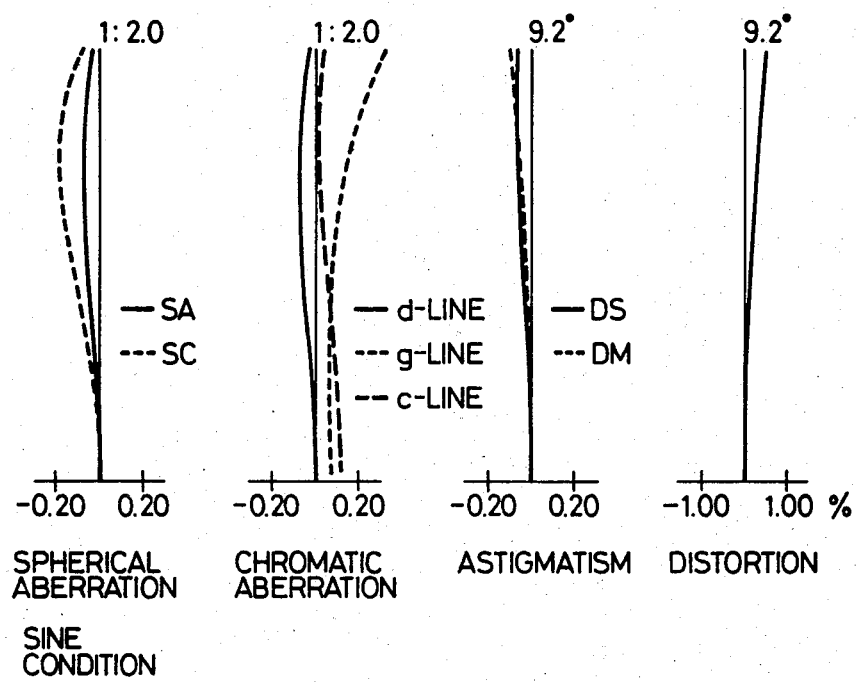
FIG. 2 is a diagram showing aberrations of the lens of Example 1 with respect to an object at the infinite distance.
Figure 4:
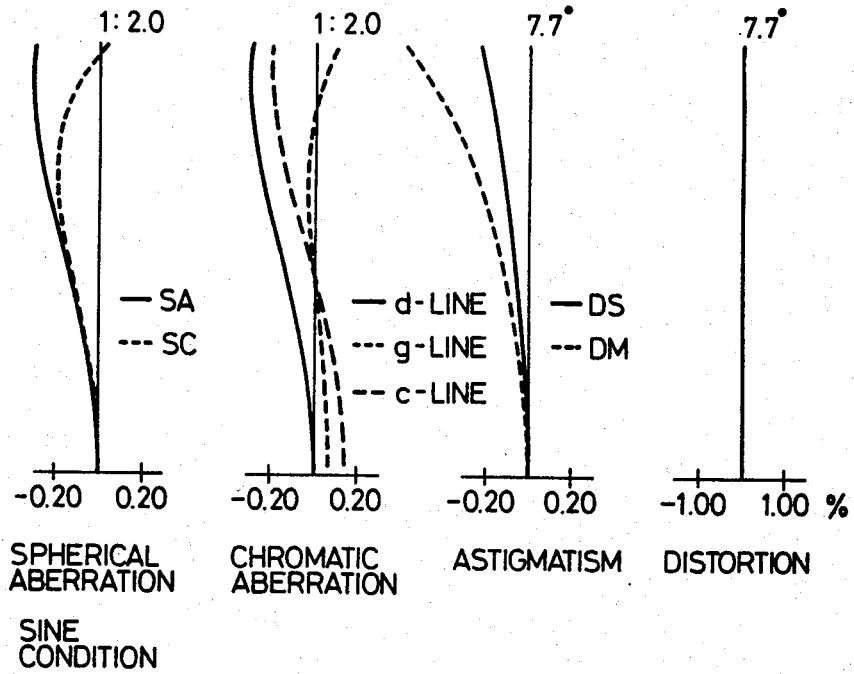
FIG. 4 is a diagram illustrative of aberrations generated by the lens of Example 1 having lenses moved ordinarily as a whole with respect to an object at a short distance (at a magnification of $-1/10X$)
Figure 5:
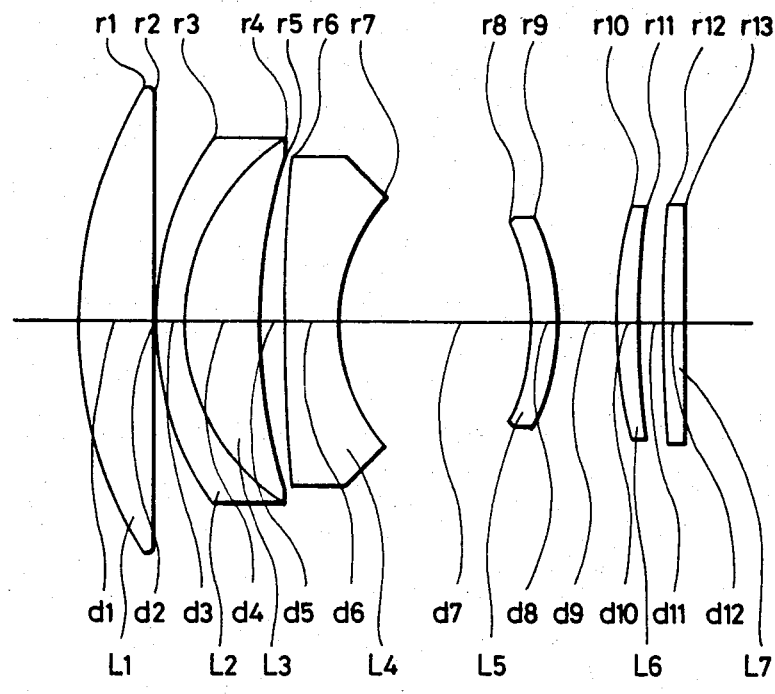
FIG. 5 is a cross-sectional view of a lens according to Example 2.

The present invention provides a large-aperture telephoto lens having improved aberrations by meeting the above requirements. Variations in aberrations when an object is moved become manifest themselves especially where the lens has a general overall lens movement system. As an example, FIG. 2 illustrative of aberrations caused by a lens according to the first Example when the object is at infinite distance, and FIG. 4 is illustrative of aberrations caused at a magnification of about $-1/10$ with the lens of first Example controlled by an overall lens movement system. Study of these figures clearly indicates worse aberrations.

The present invention eliminates the problem of worse aberrations by employing a lens movement system in which the six lens component is fixed and the first through fifth lens components are movable upon focusing. More specifically, aberrations can be improved over a wide range from the infinite distance to close locations by defining the focal length $f_7$ of the fixed sixth lens component according to the requirement (6). If $f/f_7$ were smaller than the lower limit of the range of the requirement (6), then no aberration could be corrected with respect to an object at a close distance, and $f/f_7$ were larger than the upper limit, then the first through fifth lens components would have to be moved an increased interval, resulting in an elongated lens barrel, and aberrations with respect to an object at a short distance would be corrected excessively.

Examples of the present invention will be described.

EXAMPLE 1

$f = 135$, FNO 1:2, $2\omega = 18°$
$f_{1,2,3} = 0.436\ f$, $f_5 = 10.04\ f$, $f/f_7 = 0.330$

|       |       |          |          |        |             |             |
|-------|-------|----------|----------|--------|-------------|-------------|
| $L_1$ | $r_1$ | 64.573   | $d_1$    | 11.45  | $n_1$ 1.61800 | $\nu_1$ 63.4 |
|       | $r_2$ | 3710.762 | $d_2$    | 0.10   |             |             |
| $L_2$ | $r_3$ | 50.679   | $d_3$    | 4.05   | $n_2$ 1.74950 | $\nu_2$ 35.3 |
| $L_3$ | $r_4$ | 38.886   | $d_4$    | 10.07  | $n_3$ 1.72916 | $\nu_3$ 54.7 |
|       | $r_5$ | 94.734   | $d_5$    | 3.68   |             |             |
| $L_4$ | $r_6$ | 383.622  | $d_6$    | 10.16  | $n_4$ 1.68893 | $\nu_4$ 31.1 |
|       | $r_7$ | 29.564   | $d_7$    | 26.73  |             |             |
| $L_5$ | $r_8$ | $-41.519$ | $d_8$   | 3.55   | $n_5$ 1.80518 | $\nu_5$ 25.4 |
|       | $r_9$ | $-41.500$ | $d_9$   | 16.70  |             |             |
| $L_6$ | $r_{10}$ | 70.634 | $d_{10}$ | 4.05   | $n_6$ 1.70000 | $\nu_6$ 48.1 |
|       | $r_{11}$ | 119.936 | $d_{11}$ | 4.05 |             |             |
| $L_7$ | $r_{12}$ | 250.369 | $d_{12}$ | 3.54 | $n_7$ 1.70000 | $\nu_7$ 48.1 |
|       | $r_{13}$ | 1996.195 |       |        |             |             |

EXAMPLE 2

$f = 135$, FNO 1:1.8, $2\omega = 18°$
$f_{1,2,3} = 0.476\ f$, $f_5 = 5.57\ f$, $f/f_7 = 0.318$

|       |       |          |          |        |             |             |
|-------|-------|----------|----------|--------|-------------|-------------|
| $L_1$ | $r_1$ | 71.398   | $d_1$    | 12.90  | $n_1$ 1.62041 | $\nu_1$ 60.3 |
|       | $r_2$ | 4020.868 | $d_2$    | 0.10   |             |             |
| $L_2$ | $r_3$ | 52.330   | $d_3$    | 4.82   | $n_2$ 1.72342 | $\nu_2$ 37.9 |
| $L_3$ | $r_4$ | 31.309   | $d_4$    | 15.0   | $n_3$ 1.69680 | $\nu_3$ 55.5 |
|       | $r_5$ | 94.161   | $d_5$    | 4.05   |             |             |
| $L_4$ | $r_6$ | 461.054  | $d_6$    | 8.17   | $n_4$ 1.67270 | $\nu_4$ 32.1 |
|       | $r_7$ | 30.267   | $d_7$    | 34.38  |             |             |
| $L_5$ | $r_8$ | $-41.362$ | $d_8$   | 4.37   | $n_5$ 1.70154 | $\nu_5$ 41.2 |
|       | $r_9$ | $-40.027$ | $d_9$   | 6.87   |             |             |
| $L_6$ | $r_{10}$ | 71.985 | $d_{10}$ | 4.05   | $n_6$ 1.72000 | $\nu_6$ 46.0 |
|       | $r_{11}$ | 143.722 | $d_{11}$ | 4.0  |             |             |
| $L_7$ | $r_{12}$ | 248.646 | $d_{12}$ | 4.0  | $n_7$ 1.70000 | $\nu_7$ 48.1 |
|       | $r_{13}$ | 1506.638 |       |        |             |             |

Figure 3:
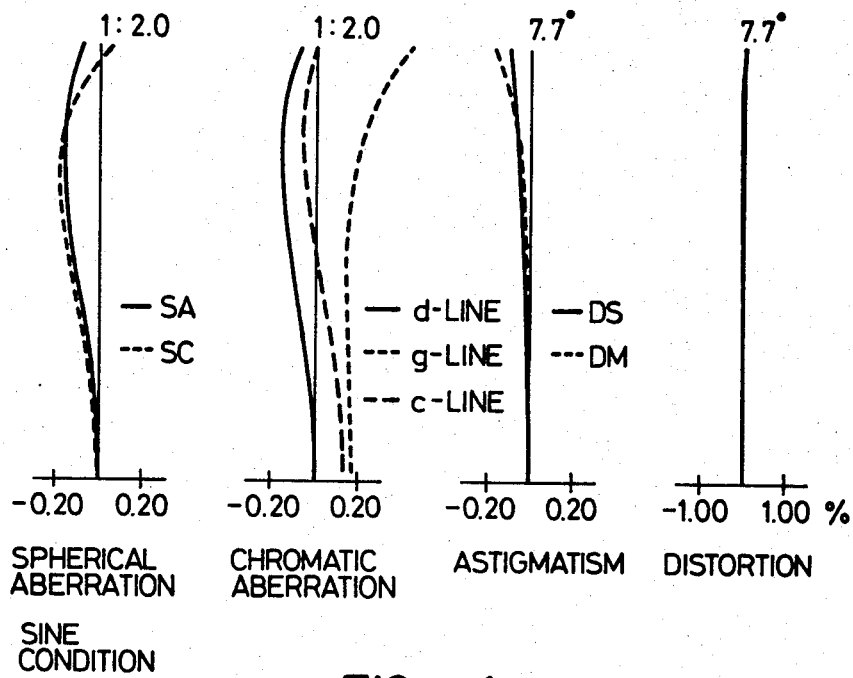
FIG. 3 is a diagram illustrative of aberrations of the lens of Example 1 with respect to an object at a short distance (at a magnification of $-1/10X$)
Figure 6:
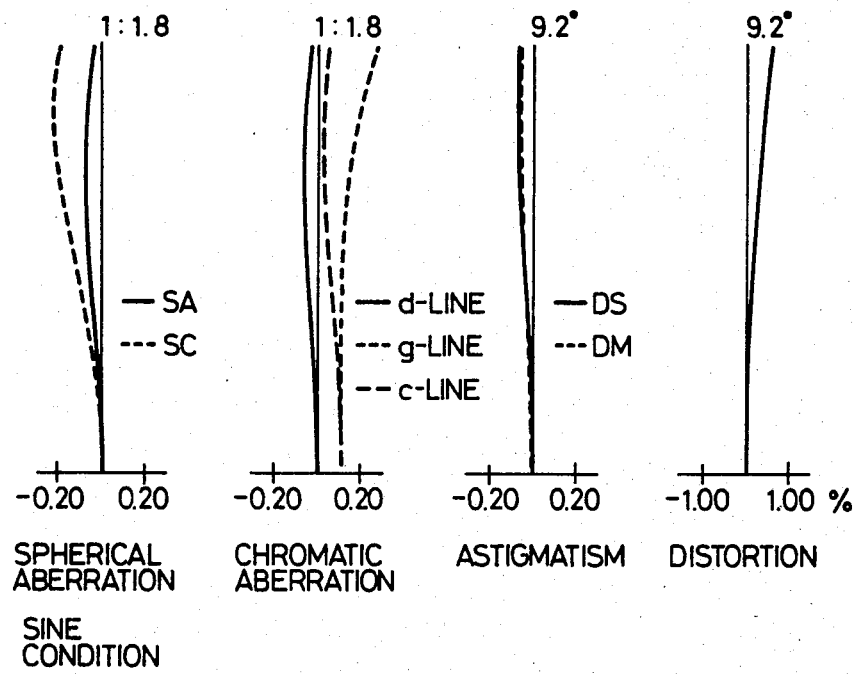
FIG. 6 is a diagram showing aberrations of the lens of Example 2 with respect to an object at the infinite distance.
Figure 7:
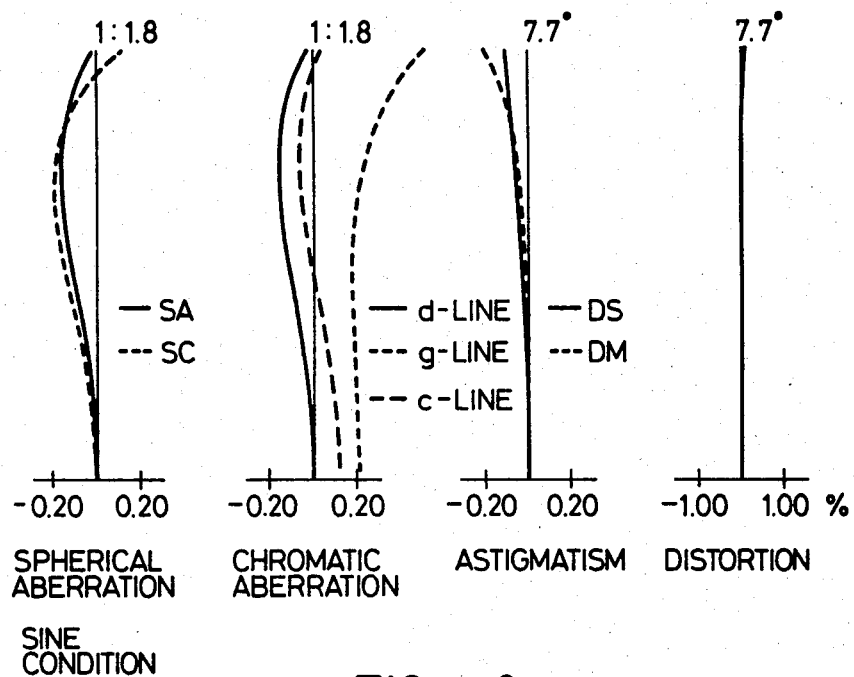
FIG. 7 is a diagram illustrative of aberrations of the lens of Example 2 with respect to an object at a short distance (at a magnification of $-1/10X$)
Figure 8:
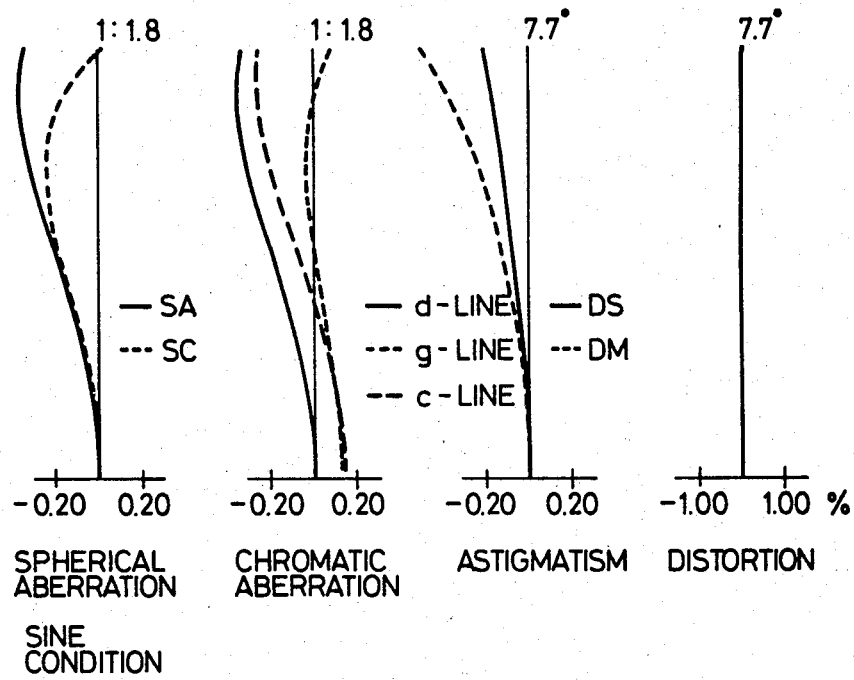
FIG. 8 is a diagram illustrative of aberrations generated by the lens of Example 1 having lenses moved ordinarily as a whole with respect to an object at a short distance (at a magnification of $-1/10X$).

FIGS. 2 and 6 are illustrative of aberrations of the lenses according to Examples 1 and 2 with an object at infinite distance. The large-aperture telephoto lenses having $F_{NO}$ of 1:2—$F_{NO}$ of 1:1.8 have sufficiently small aberrations. FIGS. 3 and 7 illustrate aberrations of the lenses according to Examples 1 and 2 at a magnification of −1/10 with $d_{11}$ being 20.64 and 20.42. FIGS. 4 and 8 show aberrations of the lenses in which the first through fifth lens components are moved to provide the same magnification. With the lens movement system according to the present invention, aberrations will become worse to a small degree, and the lens has high performance over a wide range from the infinite distance to short distances.

What is claimed is:

1. A large-aperture telephoto lens comprising seven lens elements in six lens components, the first lens component having a positive lens, the second lens component having a doublet composed of a negative-meniscus lens with its concave side facing an image and a positive-meniscus lens, the third lens component having a negative-meniscus lens with its concave side facing the image, the fourth lens having a meniscus lens with its concave side facing an object, the fifth lens component having a positive-meniscus lens with a surface of a larger curvature facing the object, and the sixth lens component having a positive lens, said large-aperture telephoto lens meeting the following requirements:

$$1.60 < \frac{n_1 + n_2}{2}, \quad 50 < \frac{\nu_1 + \nu_3}{2}; \quad (1)$$

$$|n_2 - n_3| < 0.1, \quad \nu_3 - \nu_2 > 10, \quad 0.2f < r_4 < 0.35f; \quad (2)$$

$$0.35f < f_{1,2,3} < 0.55f; \quad (3)$$

$$|f_5| < 4f, \quad 0.2f < -r_8 < 0.4f; \quad (4)$$

$$0.35f < r_{10} < f; \text{ and} \quad (5)$$

$$0.25 < f/f_7 < 0.45 \quad (6)$$

where $n_i$: the refractive index of the ith lens along d-line;
$\nu_i$: the Abbe number of the ith lens;
f : the focal length of the overall lens system;
$r_i$: the radius of curvature of the ith surface;
$f_{1, 2, 3}$: the composite focal length of the first through third lenses; and
$f_i$: the focal length of the ith lens.

2. The telephoto lens according to claim 1, wherein the sixth lens component is fixed and the first through fifth lens components are movable upon focusing.

3. The telephoto lens according to claim 2, further satisfying the following chart:

| | | f = 135, FNO 1:2, 2ω = 18° $f_{1,2,3}$ = 0.436 f, $f_5$ = 10.04 f, f/$f_7$ = 0.330 | | | | | |
|---|---|---|---|---|---|---|---|
| $L_1$ | $r_1$ | 64.573 | $d_1$ | 11.45 | $n_1$ 1.61800 | $\nu_1$ 63.4 |
| | $r_2$ | 3710.762 | $d_2$ | 0.10 | | |
| $L_2$ | $r_3$ | 50.679 | $d_3$ | 4.05 | $n_2$ 1.74950 | $\nu_2$ 35.3 |
| | $r_4$ | 38.886 | $d_4$ | 10.07 | $n_3$ 1.72916 | $\nu_3$ 54.7 |
| $L_3$ | $r_5$ | 94.734 | $d_5$ | 3.68 | | |
| | $r_6$ | 383.622 | $d_6$ | 10.16 | $n_4$ 1.68893 | $\nu_4$ 31.1 |
| $L_4$ | | | | | | |
| | $r_7$ | 29.564 | $d_7$ | 26.73 | | |
| $L_5$ | $r_8$ | −41.519 | $d_8$ | 3.55 | $n_5$ 1.80518 | $\nu_5$ 25.4 |
| | $r_9$ | −41.500 | $d_9$ | 16.70 | | |
| $L_6$ | $r_{10}$ | 70.634 | $d_{10}$ | 4.05 | $n_6$ 1.70000 | $\nu_6$ 48.1 |
| | $r_{11}$ | 119.936 | $d_{11}$ | 4.05 | | |
| $L_7$ | $r_{12}$ | 250.369 | $d_{12}$ | 3.54 | $n_7$ 1.70000 | $\nu_7$ 48.1 |
| | $r_{13}$ | 1996.195 | | | | |

4. The telephoto lens according to claim 2, further satisfying the following chart:

| | | f = 135, FNO 1:1.8, 2ω = 18° $f_{1,2,3}$ = 0.476 f, $f_5$ = 5.57 f, f/$f_7$ = 0.318 | | | | | |
|---|---|---|---|---|---|---|---|
| $L_1$ | $r_1$ | 71.398 | $d_1$ | 12.90 | $n_1$ 1.62041 | $\nu_1$ 60.3 |
| | $r_2$ | 4020.868 | $d_2$ | 0.10 | | |
| $L_2$ | $r_3$ | 52.330 | $d_3$ | 4.82 | $n_2$ 1.72342 | $\nu_2$ 37.9 |
| | $r_4$ | 31.309 | $d_4$ | 15.0 | $n_3$ 1.69680 | $\nu_3$ 55.5 |
| $L_3$ | $r_5$ | 94.161 | $d_5$ | 4.05 | | |
| | $r_6$ | 461.054 | $d_6$ | 8.17 | $n_4$ 1.67270 | $\nu_4$ 32.1 |
| $L_4$ | | | | | | |
| | $r_7$ | 30.267 | $d_7$ | 34.38 | | |
| $L_5$ | $r_8$ | −41.362 | $d_8$ | 4.37 | $n_5$ 1.70154 | $\nu_5$ 41.2 |
| | $r_9$ | −40.027 | $d_9$ | 6.87 | | |
| $L_6$ | $r_{10}$ | 71.985 | $d_{10}$ | 4.05 | $n_6$ 1.72000 | $\nu_6$ 46.0 |
| | $r_{11}$ | 143.722 | $d_{11}$ | 4.0 | | |
| $L_7$ | $r_{12}$ | 248.646 | $d_{12}$ | 4.0 | $n_7$ 1.70000 | $\nu_7$ 48.1 |
| | $r_{13}$ | 1506.638 | | | | |

* * * * *